C. W. JOHNSON.
STEERING WHEEL.
APPLICATION FILED AUG. 29, 1921.
1,431,665.
Patented Oct. 10, 1922.
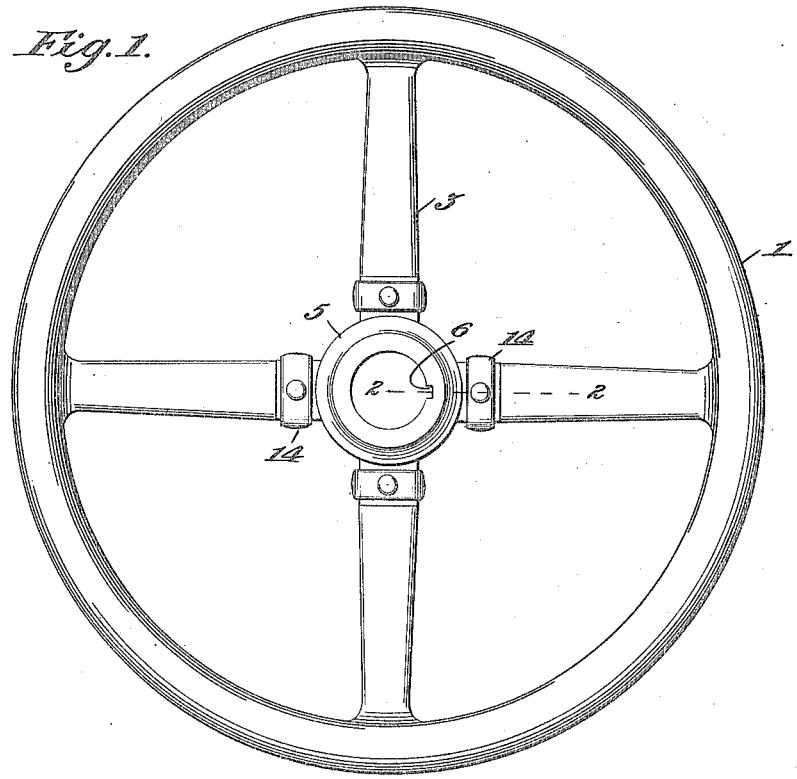
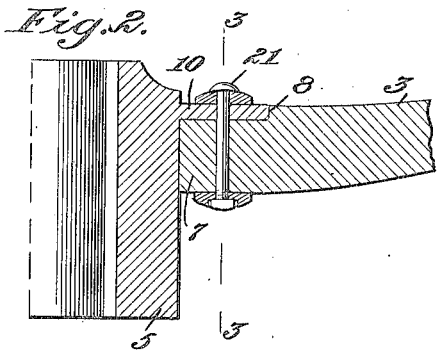
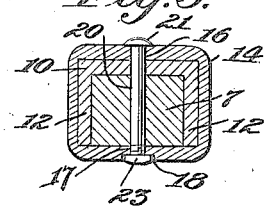
Inventor:
Carl W. Johnson,
by C. A. Mason Atty.

Patented Oct. 10, 1922.

1,431,665

UNITED STATES PATENT OFFICE.

CARL W. JOHNSON, OF ONAWAY, MICHIGAN, ASSIGNOR OF ONE-HALF TO KARL HODGE, OF POUGHKEEPSIE, NEW YORK.

STEERING WHEEL.

Application filed August 29, 1921. Serial No. 496,417.

*To all whom it may concern:*

Be it known that I, CARL W. JOHNSON, a citizen of the United States, residing at Onaway, in the county of Presque Isle and State of Michigan, have invented a certain new and useful Improvement in Steering Wheels, of which the following is a full, clear, and exact description.

This invention relates to steering wheels of the type employing a circular rim, and a spider, the arms of which are disposed radially of the rim and terminate at their inner ends in means for connection with the hub of the wheel. Steering wheels of this type are well known and are mainly employed on motor vehicles, such as automobiles, motor trucks and the like.

The present invention is particularly concerned with a simple and strong construction for joining the hub of the wheel with the inner ends of the arms constituting the spider. This means consists of a plurality of radially extending flanges preferably formed integral with the hub, and which are so constructed as to partially embrace extended portions of the inner ends of the spider arms. In order to complete the joint between such inner ends of the spider arms and the flanges which extend from the hub, bands of metal are arranged to slide over the joint between these parts, and bolts passing through such bands and the overlapping adjoining portions of the spider arms and flanges.

Other features of the invention than those herein referred to such as important combinations of parts and details of construction, will be more fully described in the following description of a preferred form of the invention, and the novel features will be pointed out in the appended claims.

In the drawings,

Figure 1 represents a plan view of a wheel embodying the invention;

Figure 2 is an enlarged sectional detail view on the line 2—2, Fig. 1, and

Figure 3 is a transverse section on the line 3—3 of Figure 2.

The wheel comprises the usual rim 1, preferably constructed of wood, and the spider 2 which is composed of the radially disposed arms 3, and the central hub 5, which latter is provided with the usual groove or keyway 6 for nonrotative engagement with the key formed upon the steering post.

In accordance with the present invention the spider arms 3, which are preferably of wood, have their outer ends secured suitably to the rim 1, and their inner ends are provided with reduced portions 7 formed by removing a portion of the material of the arm upon three of its sides, producing a shoulder 8. The hub 5 is provided with a suitable number of radially disposed flanges 10, having depending portions 12 upon opposite sides which are constructed to embrace and receive the reduced portion 7 of the spider arm, the ends of the flanges 10 abutting against the shoulders 8 of the arm so as to result in a smooth joint where the flanges are connected with the arm. Each arm is surrounded by a metallic band 14 which, when the end of the arm is seated in the recess formed by the flange 10 and its depending side walls 12, is slipped inwardly over the end of the spider arm and the flange 10, the band being of such size as to tightly embrace the end of the arm and the flange so as to rigidly connect these parts together. The band 14 is provided with alined holes 16 and 17 to receive a bolt 20 having a rounded head 21 which seats upon the upper surface of the band, while the lower surface of the band is recessed to receive a nut 23 which is threaded to the end of the bolt. A hole is drilled through the flange 10 and end 7 of the spoke to permit the passage of the bolt 20 and when the nut 23 is applied to the threaded end of the bolt and said bolt and nut turned relatively to each other to clamp the band tightly in position upon the flange and end of the arm, the band will remain in place, and may not be dislodged from its position where it clamps and firmly maintains the end of the arm and flange in connection with each other.

The inner end of each of the arms 3 is joined in the same manner as above described with the corresponding flange of the hub 5, and when the parts are so joined the resulting wheel structure will be extremely strong and rigid, and moreover, the hub may be disconnected from the spider arms very easily, as it is merely necessary to unscrew the bolts 20 from the nuts 23, and slip the bands outwardly, and the hub may be removed from the spider arms.

Having described the invention what is claimed is:

1. A steering wheel comprising, in combination, a rim, spider arms having their outer ends connected to the rim, a hub having radially disposed flanges provided with depending portions and arranged to engage the inner ends of the spider arms, and clamping bands constructed to surround said parts for holding the spider arms to the hub.

2. A steering wheel comprising a rim, suitable arms connected thereto and having reduced inner end portions, in combination with a hub provided with radially extending flanges having downwardly disposed portions to surround the inner ends of said arms, and bands for clamping engagement with said flanges and arms for securing said parts together.

3. A steering wheel comprising a rim, spider arms connected with the rim and having reduced inner ends, a hub provided with radially disposed flanges having depending portions and arranged to engage the inner ends of said arms, clamping bands movable upon said arms and arranged to be slid downwardly so as to embrace said flanges and the ends of said arms, and bolts passing through said bands, flanges, and arms, for securing said parts together.

4. A steering wheel having in combination, a rim, spider arms connected to said rim and having their inner ends reduced forming a shoulder at the termination of said reduced portion, a hub provided with radially disposed flanges having laterally depending portions and adapted to embrace the reduced ends of said arms and to engage shoulders thereon, and bands adapted to be moved outwardly upon the arms so as to embrace said flanges and the inner ends of the arms, apertures extending through said bands, flanges and arm ends, and bolts in said apertures provided with nuts which clamp the bolts in position and secure the bands upon said flanges and arms.

In testimony whereof I have hereunto set my hand this 19th day of August, A. D. 1921.

CARL W. JOHNSON.

Witnesses:
LEWIS E. WAGGONER,
ANNA A. CAMPBELL.